US010779551B2

United States Patent
Satoh et al.

(10) Patent No.: US 10,779,551 B2
(45) Date of Patent: Sep. 22, 2020

(54) SOY MILK HAVING SUPPRESSED GRASSY SMELL, AND METHOD FOR PRODUCING SAME

(71) Applicants: Kikkoman Soyfoods Company, Tokyo (JP); Kikkoman Corporation, Chiba (JP)

(72) Inventors: Chie Satoh, Tokyo (JP); Yuki Nishibori, Tokyo (JP); Ryu Sugawara, Tokyo (JP)

(73) Assignee: Kikkoman Corporation, Noda-Shi, Chiba (JP)

( * ) Notice: Subject to any disclaimer, the term of this patent is extended or adjusted under 35 U.S.C. 154(b) by 0 days.

(21) Appl. No.: 16/087,425

(22) PCT Filed: Mar. 22, 2017

(86) PCT No.: PCT/JP2017/011550
§ 371 (c)(1),
(2) Date: Jan. 11, 2019

(87) PCT Pub. No.: WO2017/164259
PCT Pub. Date: Sep. 28, 2017

(65) Prior Publication Data
US 2019/0098911 A1 Apr. 4, 2019

(30) Foreign Application Priority Data

Mar. 23, 2016 (JP) ................................. 2016-058792

(51) Int. Cl.
| | | |
|---|---|---|
| A23C 11/10 | (2006.01) |
| A23L 11/30 | (2016.01) |
| A23L 27/00 | (2016.01) |
| A23L 27/20 | (2016.01) |
| A23L 11/00 | (2016.01) |

(52) U.S. Cl.
CPC ............ *A23C 11/103* (2013.01); *A23C 11/10* (2013.01); *A23L 11/00* (2016.08); *A23L 11/31* (2016.08); *A23L 11/35* (2016.08); *A23L 27/2054* (2016.08); *A23L 27/84* (2016.08); *A23V 2002/00* (2013.01); *A23V 2200/15* (2013.01)

(58) Field of Classification Search
CPC ... A23C 11/103; A23C 11/10; A23L 27/2054; A23L 11/31; A23L 11/35; A23L 11/00; A23L 27/84

USPC ................... 426/523, 598, 634, 650
See application file for complete search history.

(56) References Cited

U.S. PATENT DOCUMENTS

| | | | |
|---|---|---|---|
| 3,579,353 A * | 5/1971 | Nakel et al. |
| 5,972,410 A | 10/1999 | Tsuzaki et al. |
| 2003/0180432 A1 | 9/2003 | Shimizu et al. |
| 2010/0086660 A1 | 4/2010 | Takai et al. |
| 2012/0183645 A1* | 6/2012 | Kim et al. |
| 2016/0192671 A1* | 7/2016 | Dierback et al. |

FOREIGN PATENT DOCUMENTS

| | | | |
|---|---|---|---|
| JP | S60-078552 A | | 5/1985 |
| JP | H01-160462 A | | 6/1989 |
| JP | H10-004904 A | | 1/1998 |
| JP | 2002-253163 A | | 9/2002 |
| JP | 2004-357621 A | | 12/2004 |
| JP | 2006-025706 A | | 2/2006 |
| JP | 3920654 B2 | | 5/2007 |
| JP | 2008-011788 A | | 1/2008 |
| JP | 4583056 B2 | | 11/2010 |
| JP | 2012-075355 | * | 4/2012 |
| JP | 2012-075355 A | | 4/2012 |
| JP | 2015-208286 A | | 11/2015 |
| JP | 2015-216846 A | | 12/2015 |
| KR | 89-0001266 B1 | | 4/1989 |

OTHER PUBLICATIONS

APC Forum, 2019 "How to make Dextrin", https://www.amateurpyro.com/forums/idnex.php?app. (Year: 2009).*
Wilkens et al., Volatile flavor components of deep fat-fried soybeans. Journal of Agricultural and Food Chemistry. May 1, 1970;18(3):337-9.
International Search Report and Written Opinion dated Jun. 6, 2017 in connection with PCT/JP2017/011550.
Kaneko et al., Studies on the key aroma compounds in soy milk made from three different soybean cultivars. J Agric Food Chem. Nov. 23, 2011;59(22):12204-9. doi: 10.1021/jf202942h. Epub Oct. 24, 2011.
Tomasik et al., The Thermal Decomposition of Carbohydrates. Part II. The Decomposition of Starch. Adv. Carb. Chem. Biochem. 1989;47:279-345.

* cited by examiner

*Primary Examiner* — Helen F Heggestad
(74) *Attorney, Agent, or Firm* — Wolf, Greenfield & Sacks, P.C.

(57) ABSTRACT

The present invention relates to a soy milk containing methylpyrazine compounds consisting of 2-methylpyrazine, 2,5-dimethylpyrazine and 2,6-dimethylpyrazine at a quantity of 40 to 7000 μg per 1 L.

4 Claims, No Drawings

SOY MILK HAVING SUPPRESSED GRASSY SMELL, AND METHOD FOR PRODUCING SAME

TECHNICAL FIELD

The present invention relates to a soy milk, and especially a plain soy milk, having a suppressed grassy smell, and a method for producing same.

BACKGROUND ART

Soy milk obtained using soy beans as a raw material has a characteristic grassy smell attributable to aldehyde compounds such as hexanal. In the case of beverages, such as processed soy milk and soy milk beverages, to which components other than soy beans and water can be added on the basis of Food Labeling Standards, this grassy smell is generally masked using fragrances. However, cases in which fragrances were added brought about the problem of the flavor of the fragrance per se being too strong and the desirable flavor inherent in soy beans being concealed. Techniques for improving flavor by adding palatinose (see Patent Document 1), perilla extract (see Patent Document 2) or yeast extract (see Patent Document 3) instead of fragrances are known, but are insufficient for masking a grassy smell.

The grassy smell characteristic of soy milk is a particular problem in plain soy milk, in which the addition of raw materials other than soy beans and water is not allowed on the basis of Food Labeling Standards.

CITATION LIST

Patent Document

Patent Document 1: Japanese Patent No. 3920654
Patent Document 2: Japanese Patent No. 4583056
Patent Document 3: Patent Publication JP-A-2002-253163

SUMMARY

Technical Problem

In view of such circumstances, the present invention addresses the problem of providing a soy milk in which unpleasant odors, and especially a grassy smell, characteristic of soy milk are masked without using secondary raw materials such as fragrances; and a method for producing same.

Solution to Problem

The inventors of the present invention found that by blending roasted soy beans instead of secondary raw materials such as fragrances, it was possible to produce a highly palatable soy milk in which a grassy smell is masked without losing the desirable flavor inherent in soy beans, and which has no feeling of roughness and a high degree of whiteness, and thereby completed the present invention.

That is, the present application includes the following inventions.

[1] A soy milk containing methylpyrazine compounds which consist of 2-methylpyrazine, 2,5-dimethylpyrazine and 2,6-dimethylpyrazine at a quantity of 40 to 7000 µg per 1 L.
[2] The soy milk according to [1], wherein the methylpyrazine compounds are contained at a quantity of 70 to 1500 µg per 1 L.
[3] The soy milk according to [1] or [2], wherein the soy milk does not contain fragrances other than components derived from soy beans.
[4] The soy milk according to any one of [1] to [3], wherein the soy milk has a whiteness of 60 or more.
[5] The soy milk according to any one of [1] to [4], wherein the soy milk is a plain soy milk.
[6] A method for producing the soy milk according to any one of [1] to [5], comprising: the step of adding roasted soy beans in which a roasting level and a blending quantity are controlled so that the content of the methylpyrazine compounds in a final product is 40 to 7000 µg per 1 L.
[7] The method according to [6], wherein the roasting level of the roasted soy beans is L20 to L80.
[8] A method for suppressing a grassy smell of soy milk, comprising the step of adding roasted soy beans in which a roasting level and a blending quantity are controlled so that the content of methylpyrazine compounds which consist of 2-methylpyrazine, 2,5-dimethylpyrazine and 2,6-dimethylpyrazine in a final product is 40 to 7000 µg per 1 L.

Advantageous Effects of Invention

According to the present invention, by blending roasted soy beans in which the roasting level and blending quantity are adjusted with raw materials, it is possible to maintain the desirable flavor inherent in soy beans while significantly suppressing a grassy smell that is characteristic of soy beans without adding a fragrance. In addition, it was supposed that adding roasted soy beans would cause a finished product to feel rough when swallowed and cause the inherent whiteness of the soy milk to decrease, but it became clear that the soy milk of the present invention is highly palatable and has no feeling of roughness and a high degree of whiteness.

Surprisingly, although a grassy smell in the soy milk was suppressed by adding roasted soy beans, it was confirmed that the amount of hexanal, which is a source of the grassy smell, had increased. Without being bound by theory, it is thought that methylpyrazine compounds, which are contained at greater quantities in roasted soy beans than in unroasted soy beans, contribute to masking the grassy smell.

DESCRIPTION OF EMBODIMENTS (Soy milk)

The soy milk according to the present invention contains 2-methylpyrazine, 2,5-dimethylpyrazine and 2,6-dimethylpyrazine (hereinafter abbreviated to "methylpyrazine compounds") at a quantity of 40 to 7000 µg in total per 1 L. By incorporating methylpyrazine compounds at a quantity that falls within the prescribed range mentioned above, a grassy smell that is characteristic of soy beans is significantly suppressed. As the quantity of methylpyrazine compounds increases, the grassy smell tends to weaken, but in cases where roasted soy beans are used, the quantity of methylpyrazine compounds falls within the range 40 to 3200 µg, preferably 55 to 1500 µg, and more preferably 100 to 1000 µg, per 1 L of soy milk in order to suppress a grassy smell and a bitter taste while maintaining the inherent desirable flavor of the soy milk.

The soy milk of the present invention contains 2-methylpyrazine at a quantity of 10 to 2000 µg, preferably 15 to 900 µg, and more preferably 30 to 570 µg, in order to suppress a grassy smell and a bitter taste while maintaining the inherent desirable flavor of the soy milk.

The soy milk of the present invention contains 2,5-dimethylpyrazine at a quantity of 15 to 600 μg, preferably 30 to 300 μg, and more preferably 45 to 250 μg, in order to suppress a grassy smell and a bitter taste while maintaining the inherent desirable flavor of the soy milk.

The soy milk of the present invention contains 2,6-dimethylpyrazine at a quantity of 5 to 600 μg, preferably 10 to 300 μg, and more preferably 25 to 180 μg, in order to suppress a grassy smell and a bitter taste while maintaining the inherent desirable flavor of the soy milk.

The content of methylpyrazine compounds can be made to fall within the range mentioned above by using roasted soy beans in the raw materials of the soy milk and adjusting the roasting level or blending quantity thereof, or by adding commercially available methylpyrazine compounds. By blending roasted soy beans, it is possible to suppress a grassy smell without adding a fragrance, but the soy milk of the present invention is not limited to a plain soy milk in which the content of solid soy bean components is 8 mass % or more. For example, separately adding a fragrance so as to obtain a processed soy milk or a soy milk beverage as a finished product from the perspectives of further masking a grassy smell and masking unpleasant odors other than a grassy smell is encompassed by the present invention. The methylpyrazine compounds added in the present invention may be commercially available compounds. However, the soy milk of the present invention is preferably a fragrance-free soy milk. As used herein, the term "fragrance-free" means that an extra fragrance is not externally added during the soy milk production process or after a finished product has been produced, regardless of whether or not the fragrance is derived from soy beans.

In cases where a finished product is a soy milk other than a plain soy milk, various additives used in ordinary soy milk beverages may be added. Examples of additives include sugars such as table sugar, common salt, calcium lactate, emulsifiers, thickening agents such as carrageenan, fragrances, colorants, oils and fats, preservatives, antioxidants, emulsifiers, spices, various extracts/pastes, proteins and decomposition products thereof, organic acids, organic acid compounds, starches and stabilizers.

(Method for Producing Soy Milk)

The method for producing a soy milk according to the present invention includes the step of carrying out adjustments so that the content of methylpyrazine compounds in the final product is 40 to 7000 μg per 1 L. For example, the content of methylpyrazine compounds can be adjusted by adding roasted soy beans in which the roasting level and blending quantity are adjusted, or by adding methylpyrazine compounds. In cases where roasted soy beans are used, the roasting level or quantity of the added roasted soy beans is adjusted so that the quantity of methylpyrazine compounds is 40 to 3200 μg, preferably 55 to 1500 μg, and more preferably 100 to 1000 μg, per 1 L of soy milk in order to suppress a grassy smell and a bitter taste while maintaining the inherent desirable flavor of the soy milk.

The step in which roasted soy beans are added is not particularly limited, and roasted soy beans may be added in any step. However, it is preferable to add roasted soy beans in a step in which a soy bean juice (gojiru) is prepared, and especially in a step in which enzymes in the unroasted soy beans are deactivated. For example, lipoxygenases, which produce aldehyde compounds such as hexanal by oxidizing unsaturated fatty acids in soy beans, are generally deactivated by heat and the like, but it is possible to add roasted soy beans, either in isolation or together with unroasted soy beans, in a deactivation step. In cases where roasted soy beans and unroasted soy beans are deactivated separately, both types of soy bean are mixed in a subsequent grinding step. By mixing roasted soy beans and unroasted soy beans prior to a grinding step, insoluble solid components such as fibers derived from soy beans are removed in a subsequent separation step, and a feeling of roughness in a finished product can be reduced.

A rough feeling can be reduced by mixing soy milk prepared from only roasted soy beans or a roasted soy bean extract liquid with soy milk prepared from only unroasted soy beans not only prior to a grinding step, but also during a grinding step or following a grinding step, for example following separation or prior to filling.

Unroasted soy beans are preferably added in a deactivation step after splitting husked soy beans. The roasted soy beans may be used as whole soy beans, but may also be used in a split or powdered state. In another aspect, splitting may be carried out after mixing unroasted soy beans with roasted soy beans. In the present invention, steps other than the addition step mentioned above are no different from those in ordinary methods for producing soy milk, and a person skilled in the art could easily specify production conditions as appropriate in order to produce a desired soy milk.

The roasting level and blending quantity of roasted soy beans can be adjusted as appropriate according to the grassy smell that occurs when a soy milk is produced using unroasted soy beans as a raw material. The roasting level (L value) of the soy beans can be adjusted as appropriate by altering the heating temperature or heating time. As used herein, the lightness of the roasted soy beans is measured using a color difference meter on the understanding that L values are such that black has an L value of 0 and white has an L value of 100. In the present invention, the roasting level is preferably such that the L value falls within the range 20 to 80. The amount of methylpyrazine compounds varies according to the type and production area of the soy beans used, but in order to achieve an overall methylpyrazine compound quantity of 40 to 3200 μg per 1 L of finished product, roasted soy beans having an L value of, for example, approximately 30 to 70 should be prepared and adjusted so that the roasted soy bean:unroasted soy bean ratio in the raw material is 1:99 to 10:90.

In cases where an intense grassy smell occurs, it is thought that a satisfactory masking effect can be achieved by using soy beans having a high roasting level, for example roasted soy beans having a roasting level of L30, and blending a high proportion of roasted soy beans, for example setting the roasted soy bean:unroasted soy bean ratio to be 10:90. Alternatively, in cases where the grassy smell is less intense or a mild roasted flavor is desired, it is thought that the desired masking effect can be achieved and an increase in roasted flavor can be suppressed by using soy beans having a low roasting level, for example roasted soy beans having a roasting level of L70, and blending a low proportion of roasted soy beans, for example setting the roasted soy bean:unroasted soy bean ratio to be 1:99.

The whiteness of a soy milk prepared using the production method described above is 60 or more. As used herein, the term "whiteness" means whiteness according to the Lab color system. Here, L denotes lightness, a denotes chroma, and b denotes hue. Whiteness measurements can be carried out using a ZE6000 colorimetric color difference meter (available from Nippon Denshoku Industries Co., Ltd.). For example, a sample is placed in a glass cell, L·a·b values are measured in reflection mode, and the whiteness is calculated on the basis of the measurement results using the formula below.

$$\text{Whiteness}=100-[(100-L)^2+a^2+b]^{1/2}$$

The present invention will now be explained in greater detail by giving specific examples. However, the present invention is not limited to these specific examples.

Example 1

(Preparation of Soy Milk)

Unroasted soy beans were prepared by husking and splitting commercially available whole soy beans. Roasted soy beans were prepared by heating the whole soy beans in a batch type drum roaster. The heating conditions were adjusted within a temperature range of 160° C. to 225° C. and a time range of 20 to 40 minutes in order to achieve the desired roasting level. Split roasted soy beans were obtained by air cooling the obtained roasted whole soy beans and then pulverizing the cooled soy beans with a pulverizer.

The obtained unroasted soy beans and roasted soybeans were blended at prescribed blending proportions. Hot water at a temperature of 95° C. was added to the soy bean mixture at a quantity corresponding to 4.3 times the quantity of the soy bean mixture, and the soy bean mixture was boiled for 6 minutes. The soy bean mixture was then ground for 10 minutes using an attritor. By subjecting the ground soy beans to centrifugal separation at 3500 G for 5 minutes, a soy milk was obtained as the supernatant liquid.

(Sensory Evaluation Method)

The obtained soy milk was subjected to sensory evaluations and a variety of tests. Sensory evaluations were carried out by 6 panelists who were selected from among researchers working for Kikkoman Soyfoods Company and had received training relating to sensory evaluations of soy milk. Evaluation items, namely grassy smell, roasted flavor, brown color, roughness and bitter taste, were evaluated using 5 grades, namely 5 points (strongly felt), 4 points (somewhat strongly felt), 3 points (felt), 2 points (slightly felt) and 1 point (not felt), using the soy milk of Comparative Example 1 as a reference, and average values were determined. Specifically, each panelist repeated a procedure comprising taking a certain quantity of the soy milk of Comparative Example 1 into their mouth, evaluating the grassy smell etc., rinsing their mouth, taking a certain quantity of another soy milk into their mouth, and evaluating that soy milk. Scores were determined by relative evaluation based on the soy milk of Comparative Example 1 (which had a score of 5 points for grassy smell, and a score of 1 for the other evaluation items).

(Measurement of Methylpyrazine Compounds)

Content values for methylpyrazine compounds (2-methylpyrazine, 2,5-dimethylpyrazine and 2,6-dimethylpyrazine) and hexanal contained in each soy milk were measured using a head space sampler method. Details relating to the head space sampler (HSS)-GC/MS apparatus and measurement conditions are as follows.

(HSS Conditions)

Apparatus: G1888 available from Agilent Technologies Japan, Ltd.

Oven: temperature: 80° C., agitation time: 20 minutes (GC-MS Conditions)

Apparatus: 7890A (GC)+5975C (MS) available from Agilent Technologies Japan, Ltd.

Column: HP-INNOWax available from Agilent Technologies Japan, Ltd. (length 30 m×internal diameter 250 µm×film thickness 0.15 µm)

Column temperature: held at 35° C. for 5 minutes, increased to 180° C. at a rate of 5° C./min, then increased to 240° C. at a rate of 10° C./min, and then held at 240° C. for 15 minutes Carrier gas: helium Injection mode: pulsed split mode, injection port temperature: 200° C.

Transfer line: 240° C.

Ion source: temperature: 230° C., EI mode

SIM parameters: m/z=56, 67, 81, 82, 94, 108

Measurement Methods:

10 g of a sample was placed in a 20 mL vial and sealed, and measurements were then carried out under the conditions mentioned above using a HSS-GC/MS apparatus. Concentration values for 2-methylpyrazine, 2,5-dimethylpyrazine, 2,6-dimethylpyrazine and hexanal were calculated from peak areas on chromatograms using calibration curves prepared using standard products for each component (2-methylpyrazine from Wako Pure Chemical Industries, Ltd., 2,5-dimethylpyrazine from Tokyo Chemical Industry Co., Ltd., 2,6-dimethylpyrazine from Tokyo Chemical Industry Co., Ltd., and hexanal from Kanto Chemical Co., Inc.) as external standards.

Color Difference:

Color difference was evaluated by measuring L·a·b values for a sample placed in a glass cell using a ZE6000 colorimetric color difference meter (available from Nippon Denshoku Industries Co., Ltd.) in reflection mode. L denotes lightness, a denotes chroma, and b denotes hue. In addition, whiteness according to the Lab color system was calculated using the formula below on the basis of these results.

$$\text{Whiteness}=100-[(100-L)^2+a^2+b^2]^{1/2}$$

Solid Soy Bean Content:

Solid content is a percentage value obtained by subtracting from 100 the moisture value (%) measured at 100° C. using a normal pressure heating-drying method.

Particle Size:

Particle size was measured using a LA-960S available from Horiba, Ltd., using water as a dispersion medium.

The measurement results are shown in table below.

| | | Comparative Example 1 | Comparative Example 2 | Example 1 | Example 2 | Example 3 | Example 4 |
|---|---|---|---|---|---|---|---|
| Roasting level and blending ratio of roasted soy beans | | 0% | L70 0.5% | L70 1% | L70 2% | L70 5% | L55 5% |
| Solid content % | | 14.1 | 13.8 | 14.0 | 13.7 | 13.5 | 13.1 |
| Color difference | L | 78.96 | 79.08 | 78.86 | 78.92 | 77.94 | 77.44 |
| | a | −2.71 | −2.69 | −2.67 | −2.68 | −2.53 | −2.12 |
| | b | 20.41 | 20.14 | 20.18 | 20.28 | 20.23 | 19.34 |
| | Whiteness | 70.6 | 70.8 | 70.7 | 70.6 | 70.0 | 70.2 |
| Particle size | Median diameter (µm) | 5.5 | 5.7 | 5.7 | 5.5 | 5.4 | 4.3 |
| Malodor (µg/L) | Hexanal | 50 | 55 | 78 | 65 | 62 | 83 |
| Methylpyrazine compounds (µg/L) | 2-methylpyrazine | 8 | 11 | 14 | 20 | 47 | 198 |
| | 2,5-dimethylpyrazine | 5 | 13 | 22 | 37 | 104 | 192 |
| | 2,6-dimethylpyrazine | 7 | 8 | 12 | 16 | 35 | 89 |
| | Total | 20 | 32 | 48 | 73 | 186 | 479 |
| Sensory evaluations | Grassy smell | 5.0 | 4.5 | 3.8 | 3.0 | 2.5 | 1.8 |
| | Roasted flavor | 1.0 | 1.2 | 1.8 | 2.3 | 3.2 | 3.8 |
| | Brown color | 1.0 | 1.0 | 1.3 | 1.8 | 2.2 | 2.5 |

-continued

|  | | | | | | |
|---|---|---|---|---|---|---|
| Roughness | 1.0 | 1.0 | 1.0 | 1.0 | 1.0 | 1.0 |
| Bitter taste | 1.0 | 1.0 | 1.3 | 1.5 | 1.8 | 2.3 |
| Grassy smell + bitter taste | 6.0 | 5.5 | 5.2 | 4.5 | 4.3 | 4.2 |

| | | Example 5 | Example 6 | Example 7 | Comparative Example 3 | Comparative Example 4 |
|---|---|---|---|---|---|---|
| Roasting level and blending ratio of roasted soy beans | | L40 5% | L30 5% | L30 10% | L30 15% | L30 20% |
| Solid content % | | 12.6 | 12.7 | 11.6 | 10.8 | 9.8 |
| Color difference | L | 73.67 | 70.93 | 66.82 | 63.00 | 59.54 |
| | a | −0.59 | 0.66 | 1.93 | 2.99 | 3.82 |
| | b | 19.25 | 18.75 | 19.00 | 19.24 | 19.59 |
| | Whiteness | 67.4 | 65.4 | 61.7 | 58.2 | 54.9 |
| Particle size | Median diameter (μm) | 1.0 | 1.6 | 0.9 | 0.9 | 1.0 |
| Malodor (μg/L) | Hexanal | 79 | 58 | 63 | 66 | 71 |
| Methylpyrazine compounds (μg/L) | 2-methylpyrazine | 550 | 841 | 1915 | 2955 | 4391 |
| | 2,5-dimethylpyrazine | 234 | 280 | 577 | 896 | 1274 |
| | 2,6-dimethylpyrazine | 164 | 265 | 563 | 861 | 1166 |
| | Total | 948 | 1386 | 3055 | 4712 | 6831 |
| Sensory evaluations | Grassy smell | 1.3 | 1.2 | 1.0 | 1.0 | 1.0 |
| | Roasted flavor | 4.2 | 4.3 | 4.7 | 5.0 | 5.0 |
| | Brown color | 3.5 | 4.2 | 4.5 | 5.0 | 5.0 |
| | Roughness | 1.0 | 1.0 | 1.0 | 1.0 | 1.0 |
| | Bitter taste | 3.0 | 3.8 | 4.3 | 4.8 | 5.0 |
| | Grassy smell + bitter taste | 4.3 | 5.0 | 5.3 | 5.8 | 6.0 |

(Effect when Externally Adding Methylpyrazine Compounds)

Prescribed quantities of methylpyrazine compounds were added to a commercially available plain soy milk (Oishii mutyousei tounyu (Delicious Plain Soy Milk) available from Kikkoman Beverage Company), and the grassy smell etc. in the soy milk was evaluated. 2-methylpyrazine was purchased from Wako Pure Chemical Industries, Ltd., and 2,5-dimethylpyrazine and 2,6-dimethylpyrazine were purchased from Tokyo Chemical Industry Co., Ltd. The results are shown in the table below.

| | | Comparative Example 5 (Delicious Plain Soy Milk) | Example 8 | Example 9 | Example 10 |
|---|---|---|---|---|---|
| Color difference | L | 80.85 | 80.84 | 80.84 | 80.86 |
| | a | −1.64 | −1.61 | −1.60 | −1.61 |
| | b | 15.88 | 16.00 | 16.06 | 16.20 |
| | Whiteness | 75.1 | 75.0 | 74.9 | 74.9 |
| Methylpyrazine compounds (μg/L) | 2-methylpyrazine | 3 | 16 | 28 | 206 |
| | 2,5-dimethylpyrazine | 12 | 41 | 66 | 214 |
| | 2,6-dimethylpyrazine | 3 | 18 | 30 | 116 |
| | Total | 18 | 75 | 124 | 536 |
| Sensory evaluations | Grassy smell | 5.0 | 3.8 | 3.2 | 2.7 |
| | Roasted flavor | 1.0 | 1.8 | 2.2 | 2.5 |
| | Brown color | 1.0 | 1.0 | 1.0 | 1.0 |
| | Roughness | 1.0 | 1.0 | 1.0 | 1.0 |
| | Bitter taste | 1.0 | 1.2 | 1.3 | 1.5 |
| | Grassy smell + bitter taste | 6.0 | 5.0 | 4.5 | 4.2 |

(Addition of Roasted Soy Beans at Fragrance Addition Stage)

Unroasted soy beans were prepared by husking and splitting commercially available whole soy beans. Roasted soy beans were prepared by heating the whole soy beans in a batch type drum roaster. The heating conditions were adjusted within a temperature range of 160° C. to 225° C. and a time range of 20 to 40 minutes in order to achieve the desired roasting level. Split roasted soy beans were obtained by air cooling the obtained roasted whole soy beans and then pulverizing the cooled soy beans with a pulverizer. Powdered roasted soy beans were obtained by further pulverizing the obtained split roasted soy beans using a pulverizer.

Hot water at a temperature of 95° C. was added to the unroasted soy beans at a quantity corresponding to 4.3 times the quantity of unroasted soy beans, and the soy beans were boiled for 6 minutes. The soy beans were then ground for 10 minutes using an attritor. By subjecting the ground soy beans to centrifugal separation at 3500 G for 5 minutes, an unroasted soy milk was obtained as the supernatant liquid. Powdered roasted soy beans were added at a prescribed blending proportion to the obtained unroasted soy milk, and stirred for 5 minutes so as to obtain a soy milk, which was then evaluated in terms of grassy smell etc. The results are shown in the table below.

| | | Samples in which roasted soy beans were added at the usual fragrance addition stage | | | | Reference (from Table 1) | | |
|---|---|---|---|---|---|---|---|---|
| | | Comparative Example 6 | Example 11 | Example 12 | Comparative Example 7 | Example 1 | Example 4 | Example 7 |
| Roasting level and blending ratio of roasted soy beans | | 0 | L70 1% | L55 5% | L30 10% | L70 1% | L55 5% | L30 10% |
| Solid content % | | 13.9 | 14.0 | 15.0 | 16.2 | 14.0 | 13.1 | 11.6 |
| Color difference | L | 79.71 | 78.28 | 65.80 | 35.84 | 78.86 | 77.74 | 66.82 |
| | a | −2.58 | −1.01 | 4.15 | 6.88 | −2.67 | −2.12 | 1.93 |
| | b | 20.31 | 16.16 | 16.53 | 11.62 | 20.18 | 19.34 | 19.00 |
| | Whiteness | 71.2 | 72.9 | 61.8 | 34.4 | 70.7 | 70.2 | 61.7 |
| Particle size | Median diameter (μm) | 5.4 | 8.4 | 17.9 | 16.5 | 5.7 | 4.3 | 0.9 |
| Malodor (μg/L) | Hexanal | 75 | 161 | 187 | 111 | 78 | 116 | 63 |
| Methylpyrazine compounds (μg/L) | 2-methylpyrazine | 6 | 27 | 628 | 3654 | 14 | 198 | 1915 |
| | 2,5-dimethylpyrazine | 4 | 60 | 723 | 1207 | 22 | 192 | 577 |
| | 2,6-dimethylpyrazine | 5 | 18 | 270 | 1107 | 12 | 89 | 563 |
| | Total | 15 | 105 | 1621 | 5968 | 48 | 479 | 3055 |
| Sensory evaluations | Grassy smell | 5.0 | 2.8 | 1.7 | 1.0 | 3.8 | 1.8 | 1.0 |
| | Roasted flavor | 1.0 | 2.5 | 4.5 | 5.0 | 1.8 | 3.8 | 4.7 |
| | Brown color | 1.0 | 1.7 | 4.0 | 5.0 | 1.3 | 2.5 | 4.5 |
| | Roughness | 1.0 | 1.5 | 2.2 | 3.8 | 1.0 | 1.0 | 1.0 |
| | Bitter taste | 1.0 | 1.3 | 2.8 | 5.0 | 1.3 | 2.3 | 4.3 |
| | Grassy smell + bitter taste | 6.0 | 4.2 | 4.5 | 6.0 | 5.2 | 4.2 | 5.3 |

INDUSTRIAL APPLICABILITY

The soy milk of the present invention is significantly suppressed in terms of grassy smell without losing the desirable flavor of the soy milk, and is therefore thought to be particularly appealing to consumers who dislike soy milk.

What is claimed is:

1. A method for producing a soy milk containing methylpyrazine compounds which consist of 2-methylpyrazine, 2,5-dimethylpyrazine and 2,6-dimethylpyrazine, at a quantity of 55 to 1500 μg per 1 L, wherein the soy milk does not contain fragrances and has a whiteness of 60 or more, the method comprising:
   the step of mixing roasted soy beans and unroasted soy beans during the production of the soy milk, in which a roasting level and a blending quantity are controlled so that the content of the methylpyrazine compounds which consist of 2-methylpyrazine, 2,5-dimethylpyrazine and 2,6-dimethylpyrazine, in a final product is 55 to 1500 μg per 1 L, wherein the color of the roasted soy beans is from L30 to L70.

2. A method for suppressing a grassy smell of a soy milk, comprising the step of mixing roasted soy beans and unroasted soy beans during the production of the soy milk, in which a roasting level and a blending quantity are controlled so that the content of methylpyrazine compounds which consist of 2-methylpyrazine, 2,5-dimethylpyrazine and 2,6-dimethylpyrazine in a final product is 55 to 1500 μg per 1 L, wherein the color of the roasted soy beans is from L30 to L70, wherein the soy milk has a whiteness of 60 or more.

3. A method for producing a soy milk, wherein the soy milk has a whiteness of 60 or more, comprising:
   the step of mixing roasted soy beans and unroasted soy beans during the production of the soy milk, in which a roasting level and a blending quantity are controlled so that the content of the methylpyrazine compounds in the soy milk is 55 to 1500 μg per 1 L, wherein the color of the roasted soy beans is from L30 to L70.

4. A method for producing a soy milk, wherein the soy milk is a plain soy milk, comprising:
   the step of mixing roasted soy beans and unroasted soy beans during the production of the soy milk, in which a roasting level and a blending quantity are controlled so that the content of the methylpyrazine compounds in the soy milk is 55 to 1500 μg per 1 L, wherein the color of the roasted soy beans is from L30 to L70.

* * * * *